Nov. 9, 1926.
R. C. SPRATLING
COMPRESSION TUBE
Filed August 21, 1924
1,605,994
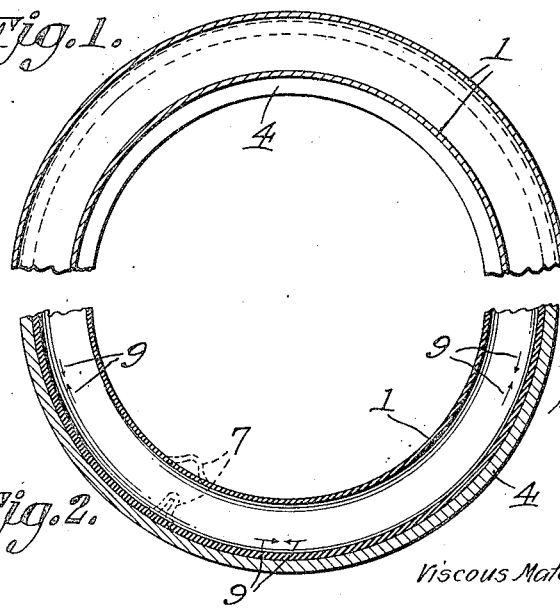
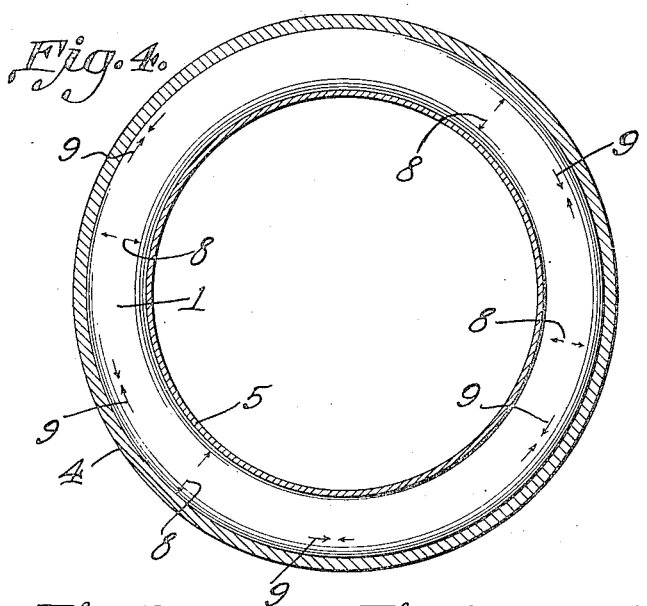
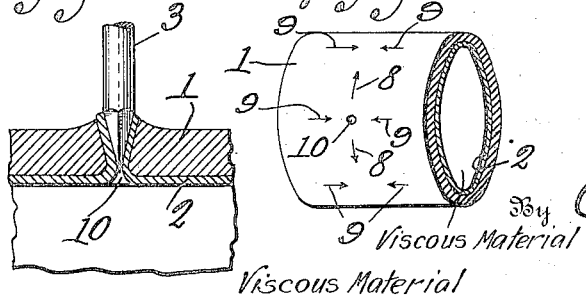
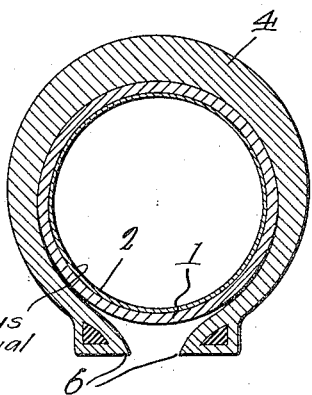
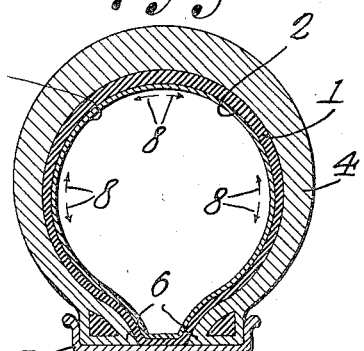
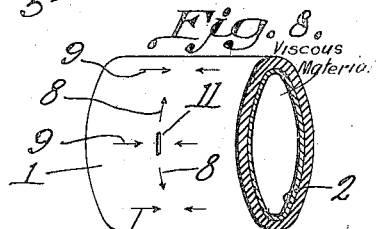
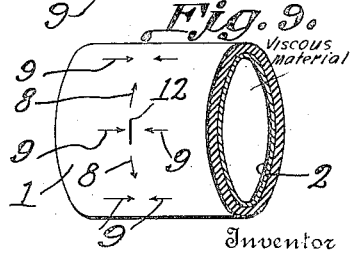
Inventor
R. C. Spratling
Attorneys

UNITED STATES PATENT OFFICE.

ROPER C. SPRATLING, OF OPELIKA, ALABAMA.

COMPRESSION TUBE.

Application filed August 21, 1924. Serial No. 733,395.

This invention relates to compression tubes for use within pneumatic tire casings and it is more especially an improvement upon that type of inner tube utilizing an inner layer of unvulcanized rubber or other sticky composition known to the trade as goo.

It is old in the art to provide compression tubes that are oversize so that, when placed within the casing and inflated, the rubber constituting the wall of the tube will be placed under increased compression so as to tend to close any puncture that may be made. In these tubes, however, the compression causes the rubber to shift toward the puncture from all directions with the result that the puncture, instead of being pinched to close it, is contracted circumferentially and, therefore, the puncture is not always completely healed. This is particularly true where the puncture is of large proportions.

One of the objects of the present invention is to provide a compression tube which will so act that when the same is punctured a tension in the tube will tend to stretch the puncture in one direction while the material of the tube held under compression will act to pinch together the elongated opposed walls of the stretched puncture so as to produce a pinching effect which will tend more efficiently to seal the puncture than would be the case should a compressing action be exerted toward the puncture from all directions.

A further object is to provide an oversize compression tube which can be easily installed, said tube being so proportioned with relation to the casing with which it is to be used that when it is inserted into the casing, after the tube has been inflated with air under low pressure, said tube can be compressed circumferentially to remove therefrom all wrinkles and insure a tight fit of the tube within its casing prior to the mounting of the casing on its rim and the full inflation of the tube.

Another object is to provide a compression tube which when fully inflated increases the compression of the material forming the tube so that the said material will tend to flow circumferentially to seal any puncture that might be made therein, the wall of the tube being constantly subjected to a slight transverse stretch due to its transverse undersize whereby any puncture made in the tube will be elongated along the lines of stretch and will contract along the lines of compression.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is an elevation of a portion of a tire casing and showing in position thereon a portion of the inner tube to be inserted into the casing, the inner tube being in section.

Fig. 2 is a view similar to Fig. 1 but showing the casing in section and the inner tube compressed and fitted snugly therein, the wrinkle or fold produced prior to the final circumferential compression of the tube within the casing being indicated by dotted lines.

Fig. 3 is a transverse section through the casing and tube prior to the full inflation of the tube and the application of the casing to its rim.

Fig. 4 is a section through a casing mounted on its rim and showing the tube smoothed out and fitting snugly within the casing.

Fig. 5 is an enlarged section through the casing, tube and rim, and showing the tube under full inflation and compression.

Fig. 6 is a section through a portion of the tube showing the action of a nail or other puncturing element in pulling goo into a puncture during the withdrawal of said element.

Fig. 7 is a perspective view of a portion of the tube showing a puncture therein, arrows being used to indicate the direction of the lines of force exerted by the material of the tube when under compression.

Fig. 8 is a view similar to Fig. 7 showing the result of the stretching action of the tube material whereby the puncture is elongated in one direction.

Fig. 9 is a view similar to Figs. 7 and 8 showing by means of arrows, how the force of compression results in pinching the elongated puncture so as to close it and insure positive healing of the tube.

Referring to the figures by characters of reference 1 designates an inner tube, the wall of which can be of any desired thickness. In practice this tube is preferably molded in circular form so as to be of the exact size and contour desired. It is also designed to provide the tube with an inner layer 2 of unvulcanized rubber, rubber compound, or other viscous substance, known as goo. This layer is extended continuously over the entire inner surface of the tube and when the tube is punctured, as by a nail 3 or other suitable element and said puncturing element subsequently withdrawn, a portion of the goo will adhere to the puncturing element and be withdrawn through the puncture as clearly shown in Fig. 6.

The tube constituting the present invention is made oversize at its outer circumference and also at its inner circumference and preferably slightly undersize in transverse area. In other words it has been found in practice that the best results are obtained by making the inner tube approximately 7% oversize circumferentially as compared with the internal diameter of its casing 4 and 1% to 2% undersize in transverse area as compared with the interior transverse area of the casing. These two proportions of circumferential oversize and transverse undersize are features of primary importance because the peculiar action of the tube as an efficient self-healing device is based thereon.

The casing 4 is of course necessarily used in connection with a suitable rim 5 and can be of any well known configuration. The tube constituting the present invention is adapted to be shipped while inflated with air under low pressure, for example, about five pounds. This tube can be wrapped in the same manner as are casings when shipped from the factory. In installing the tube its covering is first removed, if there be one, after which said tube is forced between the edges 6 of the casing until the entire tube with the exception of the wrinkled or buckled portion 7 is housed snugly within the casing. In this connection see Fig. 2. The wrinkled or buckled portion is due to the excess material in the tube resulting from the oversize of the tube. This projecting portion 7 can be taken care of, however, simply by pulling the tube circumferentially away from the wrinkled portion 7 until the wall of the tube has been placed sufficiently under annular compression to absorb surplus material. Consequently the tube will ultimately lie smooth and snug within the casing. The annular or circumferential pulling of the tube to compress it and absorb the surplus material can be effected readily because the tube, being undersize transversely, will not be held by excessive friction, when adjusted or pulled within the casing. This will be apparent by referring to Fig. 3 which shows the tube contacting with the casing through one-half or less of its area.

After the tube has been properly placed in the casing and which operation can be effected quickly without the use of tools of any kind, the casing can be placed on its rim 5. The inner tube 1 is then subjected to increased internal air pressure so as to be fully inflated, the inner circumferential portion of the tube being forced inwardly between the edges of the casing and against the rim so as not only to lock the casing to the rim but also to contract or reduce the diameter of the circular opening defined by the inner periphery of the tube. This circumferential contraction of the inner periphery of the tube will set up a corresponding circumferential compression of the material of the tube along the inner periphery thereof and as the tube has already been compressed circumferentially along the outer periphery thereof, it will be obvious that the material of the tube is densified or held under compression along annular or circumferential lines at all times.

As has already been stated the tube is undersize in transverse area. Consequently when the tube is inflated its sides are stretched outwardly against the casing and this sets up a stretching action of the material of the tube extending annularly around the air chamber in the tube. The direction of this stretching force has been indicated by the arrows 8 while the circumferential or annular compression always present in the tube has been indicated by arrows 9.

It is believed, from the foregoing description that the action of the tube in healing a puncture will be clearly apparent. When a puncturing element is withdrawn from the tube the stretching action due to the transverse undersize of the tube will tend to stretch the puncture 10 so that it will be slightly elongated as shown at 11 in Fig. 8. Practically simultaneously with this stretching action the compression force which is exerted in the direction indicated by the arrows 9 will tend to pinch together the elongated sides of the puncture so that the goo which has been pulled from the puncture will be pressed together and said puncture sealed substantially in the form of an elongated slit as indicated at 12 in Fig. 9. Thus the healing action is much more efficient than would be possible should the tube not be undersize in transverse section. If the tube should be oversize both circumferentially and transversely, the lines of compression would be extended toward the puncture from all directions. Consequently the healing action would be the same as the annular contraction of a tube rather than pinching of a tube.

What is claimed is:—

1. The combination with a tire casing, of a compression tube undersize in transverse section and oversize at its inner and outer circumferences, the inner and outer peripheries of the tube being concentric.

2. The combination with a casing, of a compression tube fitting snugly therein and normally oversize circumferentially and undersize in transverse section, said tube being inflated to fit snugly under pressure against the inner surface of the casing and between the edges thereof, the material of the tube when fully inflated within the casing being adapted when the tube is punctured to set up a stretch of the puncture in one direction and to pinch together opposed walls of the stretched puncture under the annular compression force of the tube material.

3. The combination with a tire casing, of an inner tube having a plain surface at its inner and outer peripheries adapted to be fitted snugly within the casing, said tube being oversize circumferentially not in excess of 7% and being undersize in transverse section not more than 2%.

In testimony that I claim the foregoing as my own, I have hereunto affixed my signature.

ROPER C. SPRATLING.